May 7, 1929.  J. V. MARTIN  1,712,151
COMMERCIAL AUTO
Filed Feb. 2, 1927  4 Sheets-Sheet 1
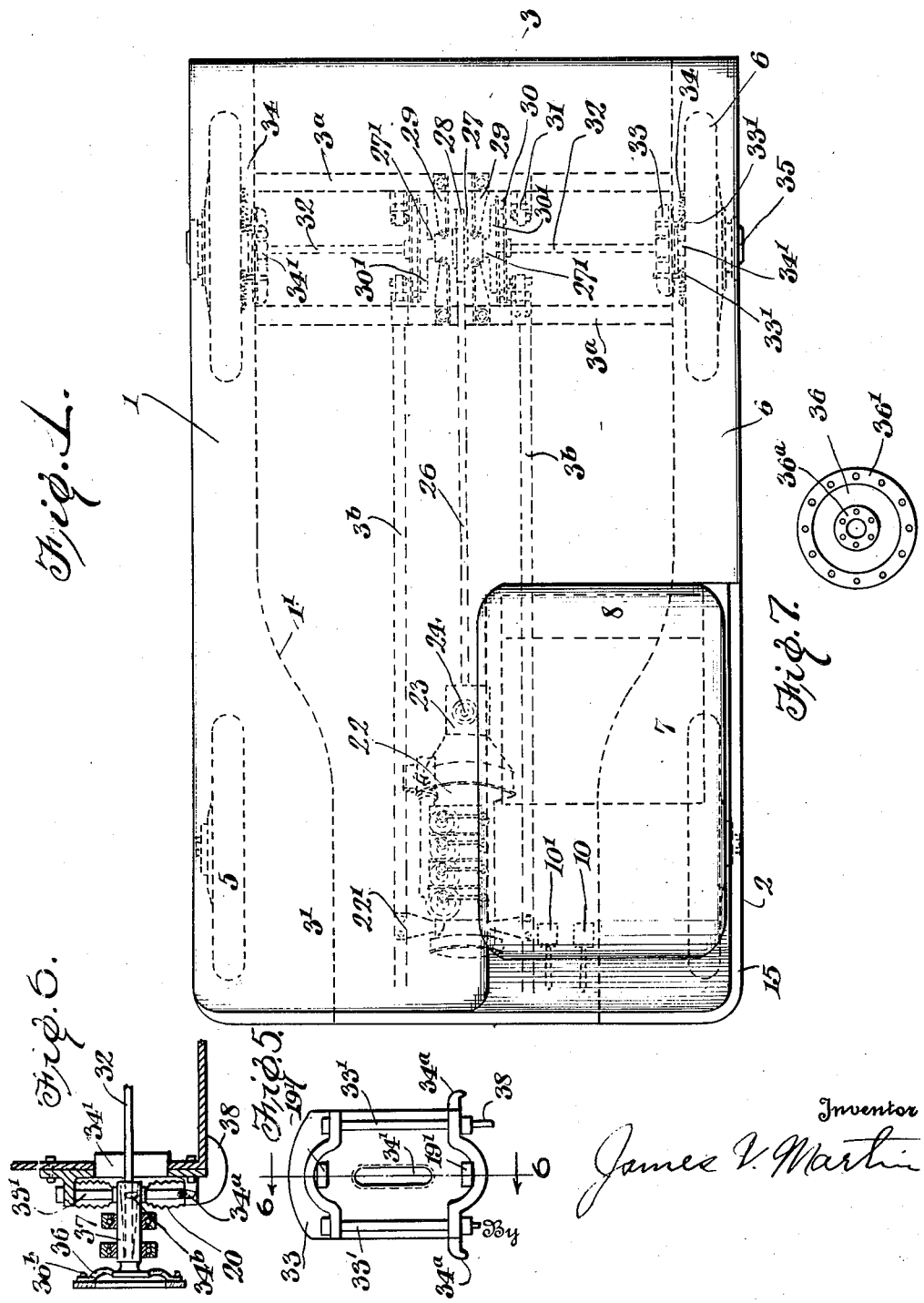

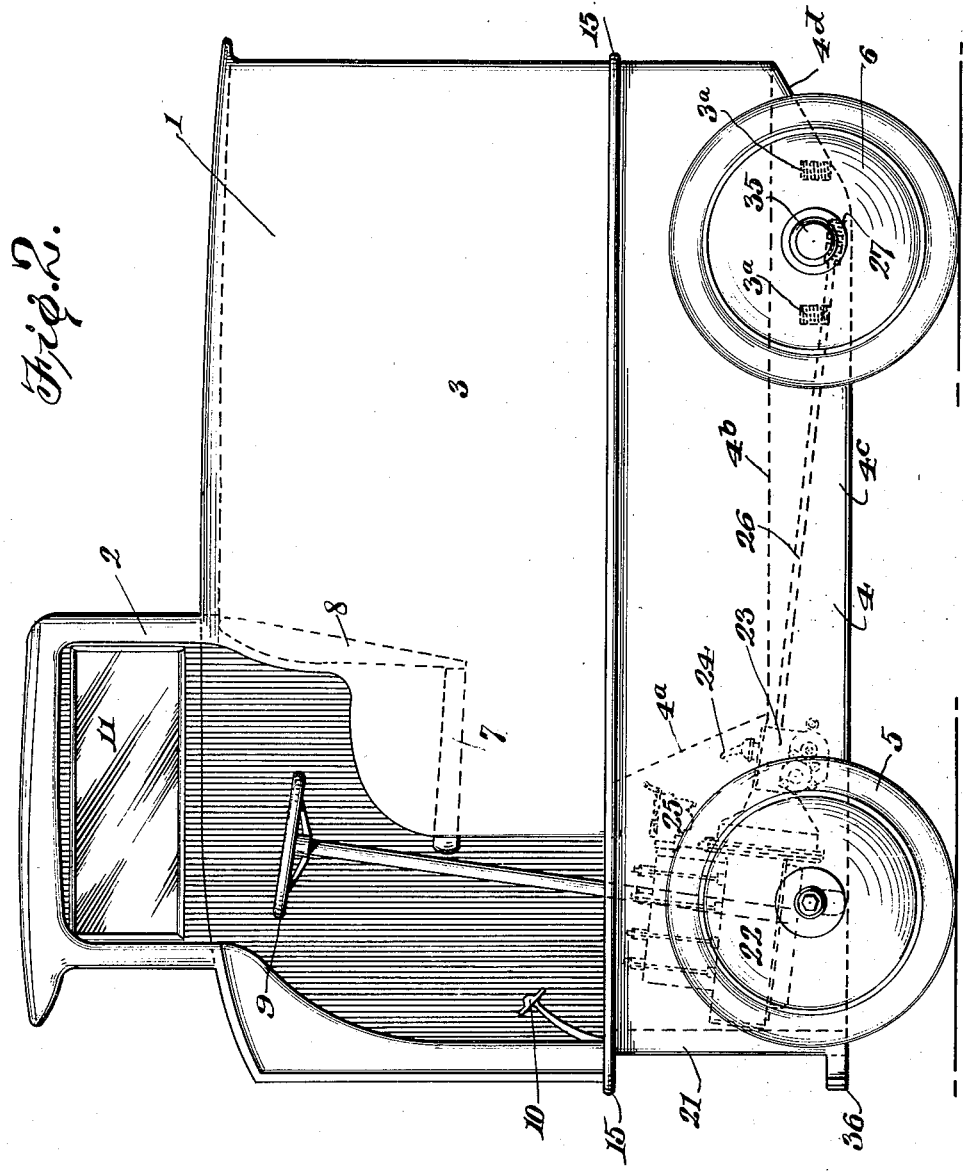

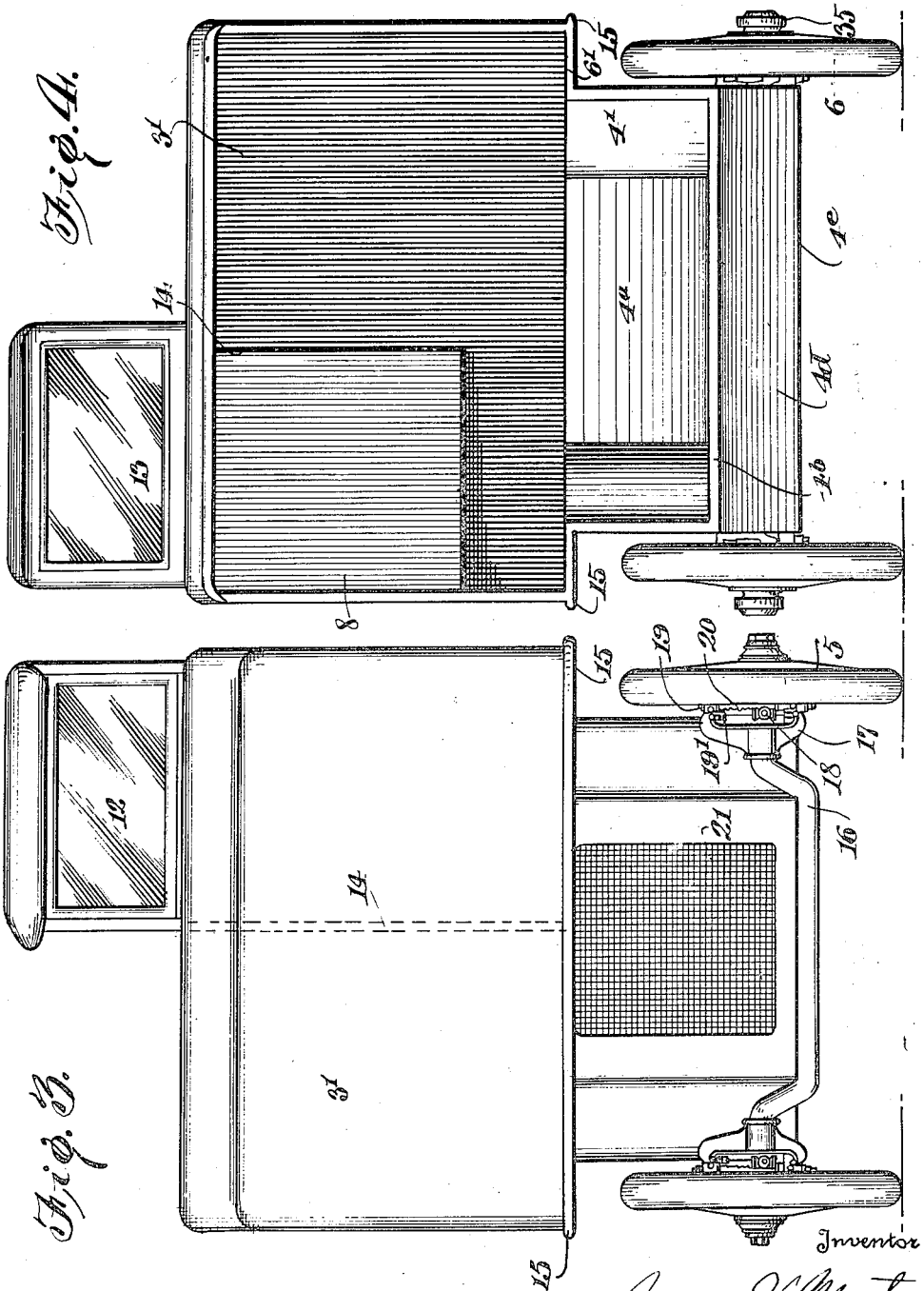

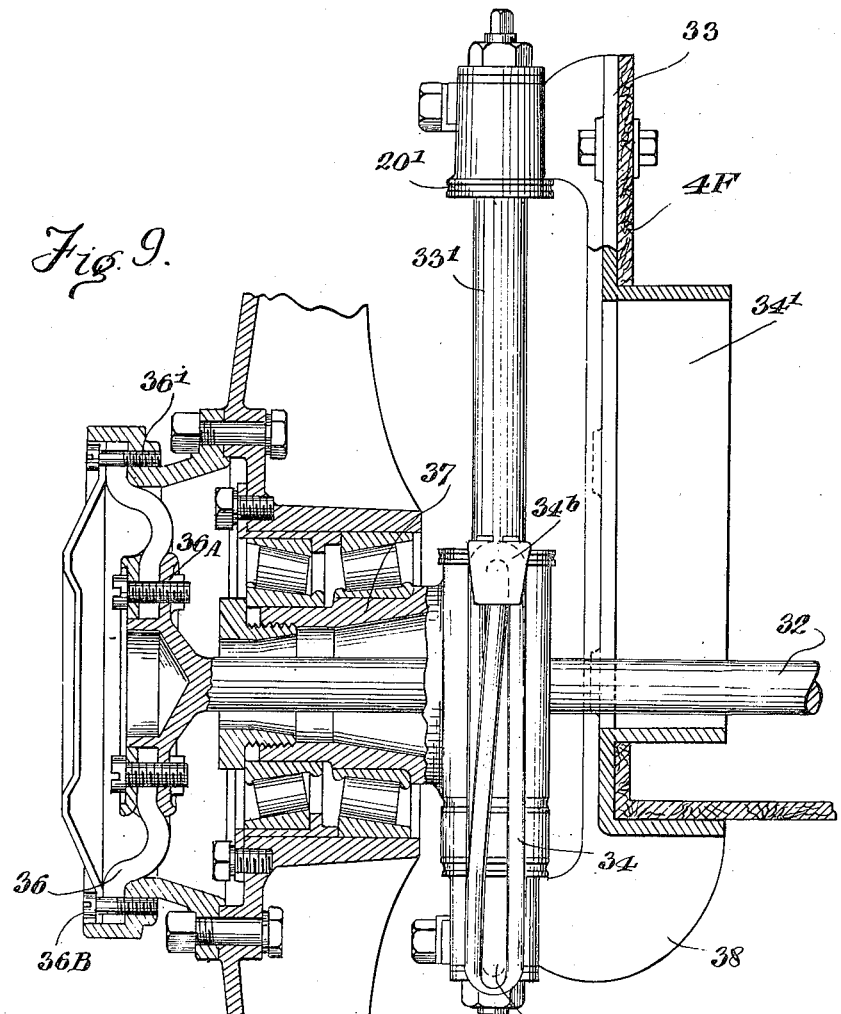
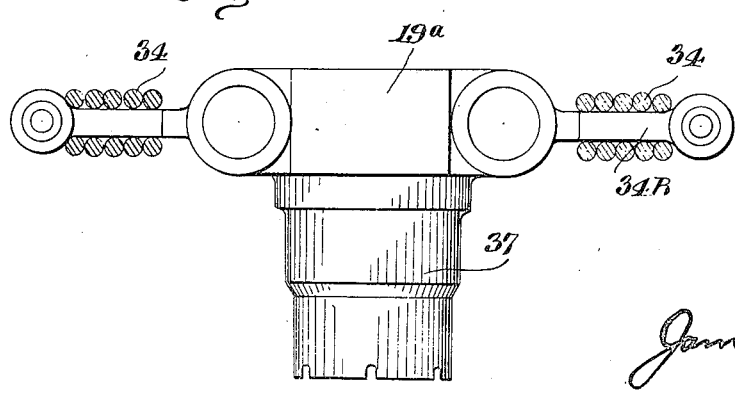

Patented May 7, 1929.

1,712,151

UNITED STATES PATENT OFFICE.

JAMES V. MARTIN, OF GARDEN CITY, NEW YORK.

COMMERCIAL AUTO.

Application filed February 2, 1927. Serial No. 165,373.

This invention relates to automotive vehicles and has particular reference to improved arrangements of the body structure, adapting same to my improved method of suspension and novel form of drive.

The primary object of the invention is to provide an improved form of body sill and wheel suspension which eliminates an intervening chassis frame such as now employed in conventional automobiles.

An important object of the invention is to economize road space by novel positions and arrangements of the driver, motor, wheels, etc. and to facilitate movement through traffic by improved vision, quick turning and special provision against damage from collision.

Another object of the invention is to eliminate the side sway due to the twisting of leaf springs and the play in the conventional spring shackles.

With the foregoing and other objects in view which will appear as the description proceeds, the invention resides in the combination and arrangement of parts and in the details of construction hereafter disclosed and more specifically pointed out in the appended claims.

Referring to the drawings:—

Figure 1 is a plan view looking down upon a vehicle representative of my invention and indicating in dotted lines the driving parts and the driver's seat.

Figure 2 is a view in side elevation showing the vehicle as viewed from the left side thereof and indicating in dotted lines the motor and worm drive.

Figure 3 is a view in front elevation showing the driver's cab on the left side of the vehicle and disclosing how the cross bracket which carries the auto body on the front wheels is dropped down in its central portion.

Figure 4 is a view in elevation looking at the vehicle from the rear.

Figure 5 is a view of the casting which is bolted to the rear lower sub-body of the vehicle on either side and forms the wheel guide and shock absorber for the drive wheels; the view is such as one would see looking at the rear lower portion of the vehicle when the wheel and drive shaft are removed.

Figure 6 is a sectional view of the casting shown in Fig. 5, taken along the line 6—6 and showing the relative positions of the wheel drive shaft and bearings.

Figure 7 is another view of the universal driving disc shown in section in Fig. 6.

Figure 8 is a view looking down upon the stub axle 37 and Figure 9 is a view, partly in section, of one rear corner of the auto showing the bracket which carries the vertical guides and showing the torque drive shaft leading from within the body sub-body portion through a slot in the body wall and through a slot in the bracket and through the center of the stub axle to a universal attached to the road drive wheel.

Referring to the details of construction 1 is the vehicle body, 2 the driver's cab, 3 the goods or cargo compartment and 4 is the sub or foundation compartment which gives the vehicle strength and houses the motor and other driving parts.

5 indicates the front wheels which are disclosed in much greater detail in my co-pending applications Serial Nos. 91,130 filed in the U. S. Patent Office Feb. 27, 1926 and 65,596 of October 29, 1925, but the present disclosure may be regarded as an improvement on the prior filings, as there are important differences including carrying the body side walls down so that they inclose all the driving parts and closing the bottom to complete a box-like structure.

7 indicates the driver's seat which is shown here located in a cab in the extreme forward left hand corner of the vehicle; my invention being illustrated in the form of a commercial or light delivery type auto, but it will be obvious that the invention is equally adaptable for a taxi as well as other types and the cab may be reversed for those countries where left hand road drive is used in place of the right hand road rules of the U. S.

8 is the back of the driver's seat which forms part of the forward division of the cargo compartment; 9 is the steering gear, 10 and 10' foot controls of conventional pattern while 11, 12 and 13 are respectively the side, front and rear glass lights through which exceptional vision is afforded in these directions. The left side is shown open and can be closed by a side curtain or by a suitable door.

14, Fig. 3, indicates a partition on the driver's side which separates his cab from the portion of the cargo space 3' which extends to the very front of the vehicle: 15 is a wearing streak which extends all around the vehicle excepting across the back and is designed to protect the body from injury while rubbing through traffic. 16 indicates the dropped type of axle or bracket which forms part of the strength of the lower or sub-portion of the body, it being one of the features of my invention to do away with the conventional chassis and combine the functions thereof in the sub-body 4. The bumper 36 of Fig. 2, has been omitted in Fig. 3 so that the dropped bracket 16 may, the more clearly be seen. 17 shows a forked casting which is rigid with the dropped bracket 16 and which holds a vertical guide or king pin 19 on which the wheel stub axle travels vertically suspended upon rubber cords such as 34 indicated dotted over $34^a$, and $34^b$ of rear wheel support casting 33, and which (the said steering wheel stub axle) is guided on the said king pin for shock absorption and for steering through a steering lever 18 of conventional pattern. Soft rubber bumpers 19' stop the movement of the stub axle at each end of the king pin. $19^a$ is an alternative form of rubber bumper, while the same is kept lubricated by grease contained within bellows 20. The front and rear wheels are both guided for shock absorption by the same sort of guides, with the difference, that whereas the front wheel has but one guide about which it may be turned for steering the rear wheel is held for rotation in one plane by two similar guides. 20' indicates a groove for the attachment of a bellows to protect the guide 33' from dust above and below the stub axle part as more fully disclosed in my co-pending application, Serial No. 91,130.

21 indicates a conventional type radiator or dummy and 22 the four cylinder motor which is set into the vehicle at an angle, see Fig. 2. Fig. 1 discloses my novel arrangement of the motor and driver and front wheel so that the driver's feet and the vehicle controls may occupy a position between the said motor and the left front wheel while still permitting the wheel a full 30 degree angle with clearances for turning. This is accomplished by bending the sub-body portion at 4', while $4^a$ shows the forward bottom partition of the sub-compartment from the cargo space and $4^b$ the top of the sub-compartment or the bottom of the cargo space and $4^c$ the bottom of the sub-body and also the bottom of the vehicle which slopes upward at $4^d$. This sub-body is an important part of my invention in its combinations with the body and with the driving, supporting shock absorber and steering means disclosed, i. e. the sub-body forms a box section for strength to give rigidity to the body and also incloses and resiliently supports the motor drive parts.

6' indicates the top of the rear wheel housing which may be used as a passenger seat.

The part 4' (se Figs. 4 and 1) is continued past $4^b$ to join with $4^c$ (see Figs. 2 and 3). This portion of 4' which joins $4^b$ and $4^c$, corresponds to the sill of conventional motor car bodies, but because of firm union with the transverse partitions $4^b$ and $4^c$, this sill with its attached members including $3^b$, forms a boxed-in or sub-body 4 sufficiently strong for the direct attachment of the wheel brackets, no chassis being required.

23 is the unit form of gear box with shifting lever 24 connected in conventional manner with the controls adjacent the driver's seat.

25 indicates the carburetor from which controls may be led to the steering wheel 9 and 26 indicates the propeller shaft shown without universal joints because the engine bearers $3^b$ are built integral with the sub-body and form a non-flexing support for the retention of the alignment of the shaft bearings and for the worm gear housing on like bearers $3^a$. The bearers $3^b$ are firmly attached at their tops to the floor $4^b$ and on their bottoms to $4^c$, the bottom of the vehicle; thus 4 becomes a completely closed-in box like section which gives the body sufficient strength to carry the wheel drive and suspension without the intervention of a chassis frame. The worm gear housing is supported by brackets 29 on bearers $3^a$ and the worm gear 28 is driven by the worm 27 on the same rigid sub-body support with the motor 22. 30 indicates the left hand brakes attached to $3^a$ at 31, so that the brake torque from the brake drum 31' is absorbed by the lower body portion and does not cramp the guides 33'; the bearings 27' are housed on both sides of the gear wheel 28 and universal joints 36 like those shown in Figs. 6 and 7 are located within the brake drums 30' and are attached to the worm gear by short shafts. The universals drive the short axle shafts 32 which terminate in universal joints such as 36 attached to the outside of wheels 6 in the enlarged hubcap 35.

The weight of the rear portion of the body is transferred from the sub-body to the wheel 6 through a casting 33 (Fig. 5) which has two vertical guides 33' which carry the stub axles 37 for the wheels 6 and also the rubber cord suspension brackets $34^a$ while the stub axle portion itself carries like rubber cord holder brackets $34^b$. The casting 33 provides a slot on aperture 34' for the free movement of the drive shaft 32, thus nearly all the drive mechanism is "sprung" on the body side of bracket 33 and only the wheel 6 and one end of shaft 32 is left unsprung.

38 shows the web reinforcement of the casting 33 where same supports under side of vehicle sub-body. 36' shows a steel ring bolted as at 36ᵇ to the flexible fabric universal joint 36 and 36ᵃ shows a like steel ring in the center thereof. It will be observed that the said universal disc 36 has a radiused portion intervening between the two rings 36' and 36ᵃ and the angularity afforded by the straightening out of this radiused portion is the function of the flexible disc. It will be observed that while one end of drive shaft 32 is secured by alternate bolts to the ring 36ᵃ the part to be driven, as the wheel, can be secured to alternate bolts 36ᵇ of large ring 36'; the purpose of using alternate bolts to effect the attachment is to leave the ring and disc at all times firmly secured together. The best results are obtained by using a more flexible material as at 36 (Fig. 7) between the rings 36' and 36ᵃ. 34ᵇ and 34ᵃ are shown in Figs. 5 and 6 with the rubbers 34 removed, but it will be apparent that the wheels 6 on the bearings shown in Fig. 6 partly inclose the rubber cords 34 and also the guides 33'. Dotted lines indicate in Figure 6 that the stub axle 37 has a large tapered interior to permit shaft 32 free rotation and movement within the angularity permitted by the universal joint 36. The body and sub-body may be built separately and then joined together and may be built of metal, cast in composition or built, as shown of wood and metal. Reference is made to my co-opending application Serial No. 65,596. By a body I mean any container for passengers or goods.

From the above it will be seen that I have disclosed a type of vehicle which economizes weight, complication, material and road space, permits universal vision for the driver and provides a novel, simple and easy riding form of drive from the motor to the wheels. Some of the details of the wheel construction were disclosed in my U. S. Patents Nos. 1,471,968 of Oct. 23rd, 1923; 1,432,771 issued Oct. 24, 1922, and 1,546,500 issued July 21st, 1925, but several improvements as well as new combinations have been herein described and it will be obvious that changes may be made from the particular disclosure without departing from the spirit of the invention and I do not bind myself to the exact forms exemplified.

What I claim as new and desire to protect particularly is:—

1. An automobile with a boxed-in and partitioned-off lower body portion, the said portion housing the rear drive to the wheels and being rigidly attached at its rear sides to brackets and each bracket yieldably attached to road wheels for relative vertical movement while unyieldably holding said wheels in their rotational plane by means of inclosed cylindrical guides.

2. In combination with the lower portion of an auto vehicle body having a boxed-in lower portion, a bracket fixed thereto, two inclosed vertical cylindrical guides on said bracket, a hollow stub axle guided on said guides and a drive shaft passing through the side of the said body boxed-in portion though the said axle to a universal joint external thereto.

3. In an automobile a body having a strengthened sub-body built integral with the said body and including the body floor as the upper part of a boxed-in trussing structure, the prolonged sides of the body forming the sides of the said boxed-in structure and joined across their bottoms by a horizontal covering, and the said sub-body extending from resiliently supported and vertically guided front wheels to similarly supported and guided rear wheels of the said automobile, the said sub-body serving as a substitute for the conventional chassis frame and unyieldingly holding the said rear wheels in their plane of rotation.

4. In combination with and directly attached to the boxed-in sub-body of a vehicle body a bracket provided with two wholly inclosed vertical guides, a stub axle guided thereon and provided with arms for the retention of rubber bands, a wheel rotating on said axle and held in its plane of rotation by the said guides, corresponding arms oppositely disposed upon the said bracket and brake means of stopping the said vehicle without cramping the said guides.

5. The combination in a motor vehicle body of a partitioned off lower portion of the said body, engine bearers built rigid with the said lower portion and continuing from the front to rear thereof, a transverse brace extending at approximately right angles to the said engine bearers at the rear end thereof and across the said lower portion of the said body, a horizontal closure for the bottom of the said lower portion and means independent of the driving axle of the said vehicle for resiliently attaching the said lower portion to drive wheels for the said vehicle.

6. The combination of a bracket attached directly to the lower part of a vehicle body, said bracket provided with vertical cylindrical guides inclosed within bellows, a stub axle part guided upon the said guides between the said bellows and both the said stub axle part and the said bracket provided with oppositely disposed arms adapted to yieldably support the said body on the said wheel through the resistance of elastic bands surrounding the said arms.

7. In combination an auto vehicle body and a drive including a universal joint in the rear axle mechanism and a drive wheel, two transverse braces integral with the lower portion of the said body including the floor and the said drive located between and supported by the two said braces, a guide bracket attached to the wall and extending along the side of the said body adjacent the wheel center and provided with two entirely inclosed guides for maintaining the said wheel in its plane of rotation.

8. The combination in an auto vehicle having road wheels, of a body having a boxed-in lower portion, the floor of the said body forming the top of the said boxed-in portion, the sides of the body prolonged to form the sides of said portion and a closure forming the bottom of the said portion, driving shafts housed within the said portion and means of springing each said road wheel by an independent connection to the said boxed-in portion.

9. In an automotive vehicle, a body built integral with a partitioned off box-like sub-body, a power unit firmly secured to the said sub-body, brackets rigidly attached to the said sub-body and yieldably attached to a drive wheel for the said vehicle by means of a vertical guide with an entirely inclosed guide surface and a drive means located within the said sub-body and rigid therewith driving the said wheel through a flexible drive means.

10. In an automotive vehicle a body built rigid with a partitioned off and boxed-in sub-body, brackets on the sub-body resiliently supported by wheels and holding the drive wheel in a fixed plane of rotation and means to drive the said wheel by a shaft from a reduction gear secured to the said sub-body rigidly, the said drive shaft located substantially within the said sub-body and protruding from an aperture in the wall thereof adjacent the said drive wheel, the said bracket provided with cylindrical guides.

11. In combination with the rear axle drive of an auto vehicle having a drive wheel, two brace members built integral with the lower portion of the vehicle body and arranged parallel with and one on each side of the said rear axle drive, the said brace members supporting a universal joint connection and a brake at their centers and a shock-absorber bracket surrounding the said drive at the ends of the said brace members, the said bracket provided with two guides protected from dust in all positions of the shock absorber and holding the said wheel in a fixed plane of rotation.

12. In combination with a road vehicle provided with a body having a boxed-in lower portion, held rigid with the upper part of the body, a motor and differential driving mechanism rigid with the said lower portion, brackets supporting the said lower portion resiliently on wheels and one of the said brackets providing a slot for the free vertical movement of a driving shaft to one of the said wheels, another of the said wheels guided for vertical movement upon one of the said brackets by means of an entirely inclosed vertical guide and means of braking the last said wheel without cramping the said guide.

13. In combination with a road vehicle having a boxed-in and divided-off lower portion, a motor supported on bearers in the forward portion of the said boxed-in portion, a transverse brace rigid with and extending from the said portion and carrying resiliently at each end a steering wheel, vehicle controls located at the forward end of the said motor between the said motor and one of the said steering wheels and the said brace bent downwardly from each steering wheel to its attachment to the said boxed-in portion.

14. The combination in a motor vehicle of a body having a strengthened sub-body built integral therewith, a motor and driving mechanism rigid with the said sub-body, a transverse brace rigid with the forward end of the said sub-body and carrying at each end a steering wheel vertical guide bracket having its guide surface entirely inclosed, brackets attached to the rear side of the said sub-body and holding the drive wheels unyieldably in their plane of rotation while guiding them vertically and resiliently on bearings, means to drive one of the said wheels and means to brake the said vehicle without cramping any of the said guides, the said rear guides being cylindrical and entirely inclosed.

15. In combination with a vehicle having road wheels and a body with uneven top portions, a cab extending upwardly beyond the top of the other portions of the said body and independent resilient connections between each said road wheel and the said body.

16. The combination in a motor vehicle arranged in order along a line from one forward steering road wheel across the front of the vehicle to the other steering road wheel, a stub axle guided for vertical movement on a king pin, a rigid connection for said pin with the forward lower portion of the vehicle body, a foot control pedal for the control of the said vehicle, a motor to drive the said vehicle and a compartment partitioned off from the said foot pedal.

17. The combination in a motor vehicle of a body provided with a partitioned off box like sub-body, a driver's seat in a cab, the said cab having for its floor a part of the said partition in one of the two forward corners of the said body and a bracket secured to and extending from the said sub-body to a steering road wheel under the said cab, the said bracket providing an entirely inclosed vertical guide and king pin and rubber means of resisting the vertical movement of the said wheel on the said guide.

18. The combination in an auto vehicle of a driver's cab in one of the two extreme forward corners of the said vehicle, the non-cab portion of the said vehicle being partitioned off from the said cab on the inside and back of the said cab, but supported in common with said cab by a boxed-in lower body portion and the said boxed-in portion being resiliently attached to road wheels by brackets rigid with said body, there being one bracket for each said wheel.

19. In a motor vehicle a body providing a driver's cab in one extreme forward corner thereof, and a closed vehicle compartment partitioned off from said cab on the opposite corner and the vehicle motor located below the floor of the said compartment.

20. In a motor vehicle body a driver's cab in the forward corner of the said body and a partition completely separating the said cab on the inside thereof from another compartment of the said body, the said compartment extending from extreme front to rear of the said body and a motor located below the floor of the said compartment.

21. A motor road vehicle including a body having a partitioned off sub-body rigidly attached thereto and forming therewith the main strength unit of the said vehicle, brackets resiliently supporting the said sub-body on wheels, the rear of the said body having a closed top and adapted for the reception of persons or goods, a motor located in the extreme forward end of the said sub-body and a partitioned off driver's cab located on one side of the said motor, each of the wheels being independently sprung upon one of the said brackets.

22. In combination with an auto vehicle a partitioned off driver's cab in one of the extreme forward corners of the said vehicle, the said partition arranged so that it separates the said cab from another compartment of the said vehicle, the vehicle motor located below the floor of the said cab and a bracket resiliently attached through inclosed vertical guides at each end thereof to steering road wheels and passing under and rigidly supporting the said cab and motor.

23. The combination in a motor vehicle of a driver's cab located in the extreme forward corner of the said vehicle, a vehicle motor located at one side and below the said cab, the floor of the said cab forming the top of a boxed-in lower body portion and a bracket rigid with the said boxed-in portion on each forward side thereof and in an independent resilient connection between each said bracket and a road steering wheel.

In testimony whereof I affix my signature.

JAMES V. MARTIN.